N. KOLOMYJCZUK.
STUMP PULLER.
APPLICATION FILED JAN. 3, 1917.
1,231,618.
Patented July 3, 1917.
3 SHEETS—SHEET 1.
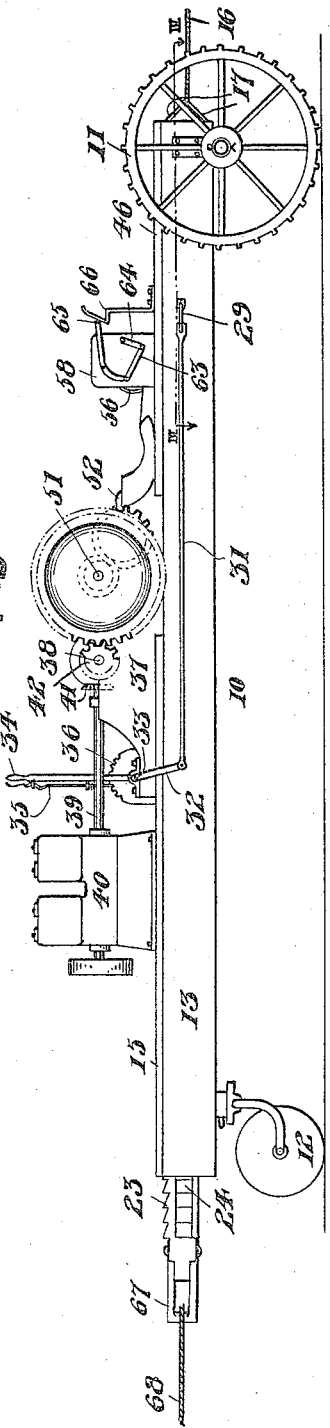
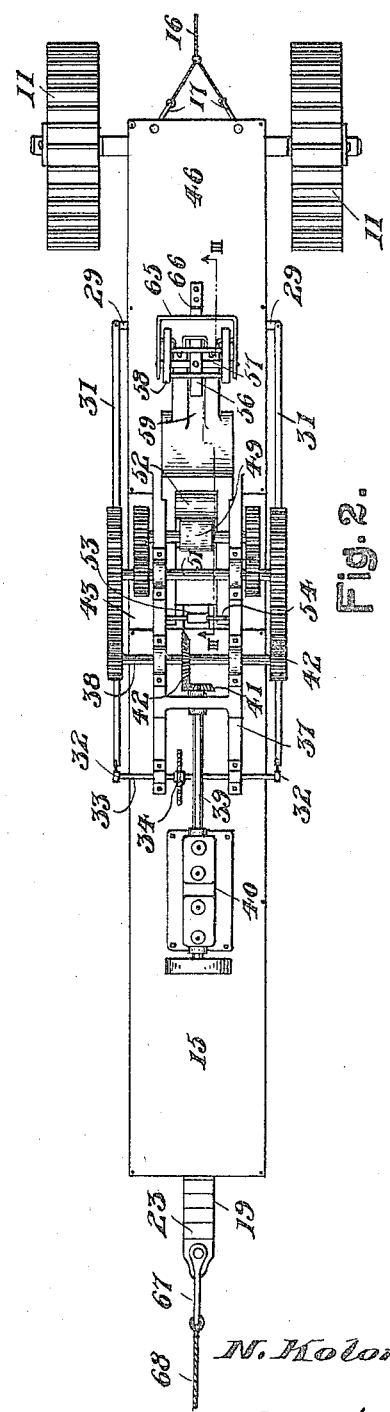

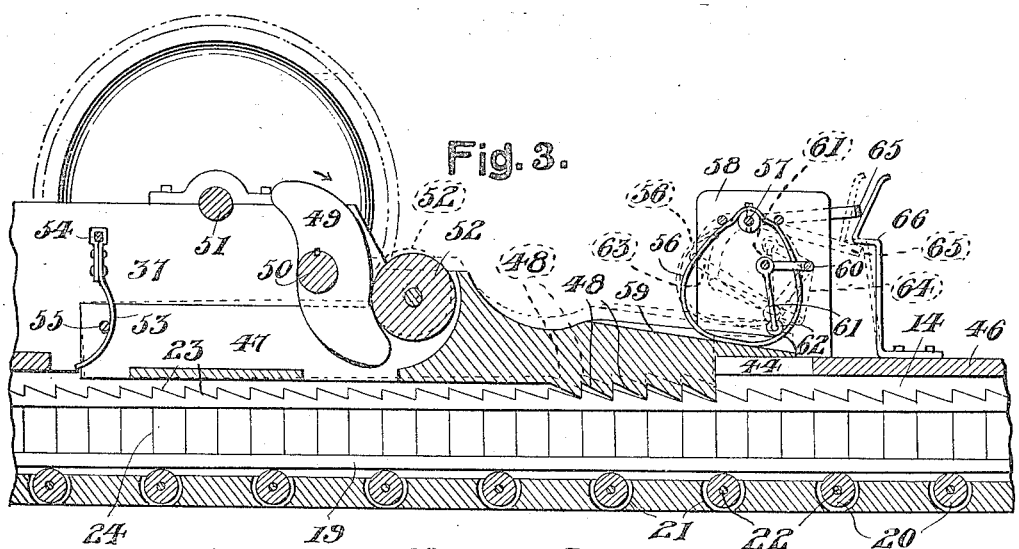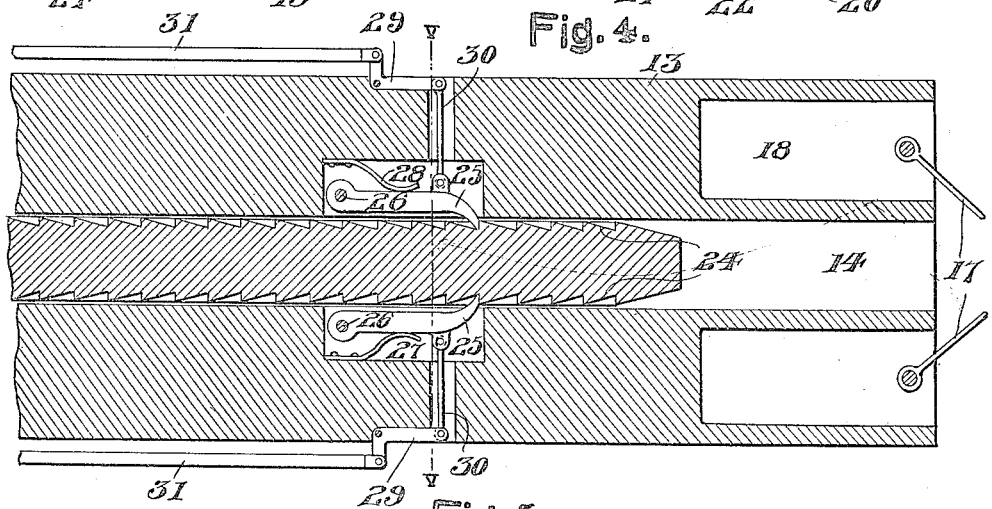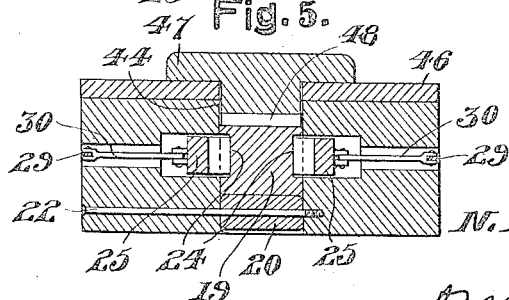

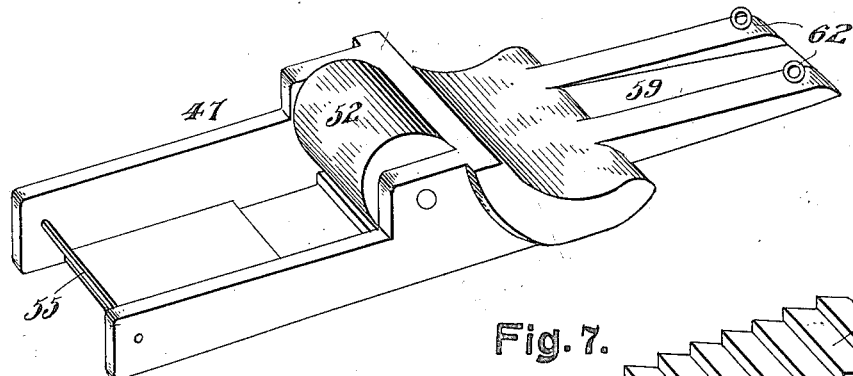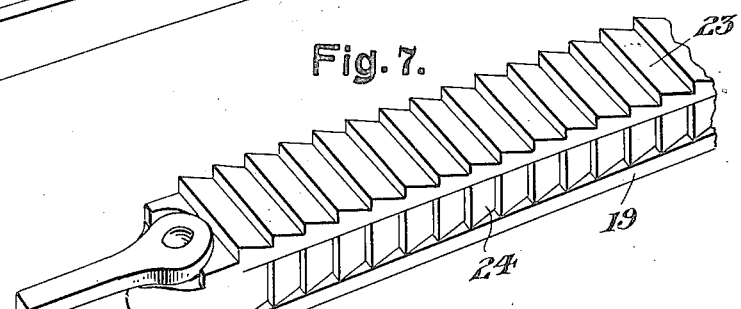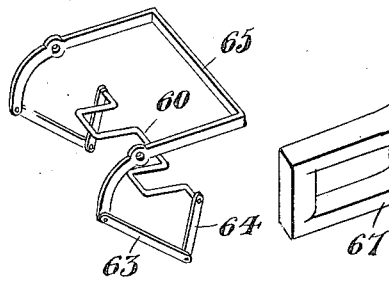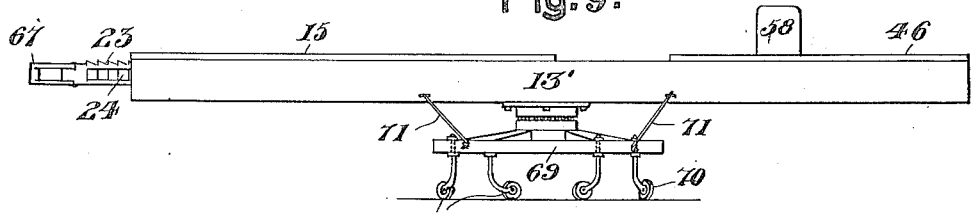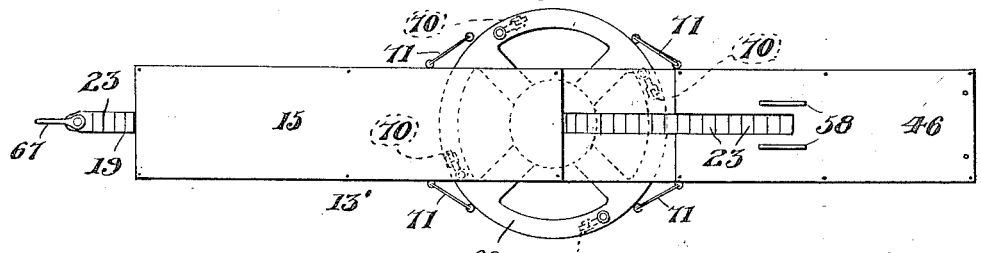

UNITED STATES PATENT OFFICE.

NYKOLA KOLOMYJCZUK, OF SOUTH PORCUPINE, ONTARIO, CANADA.

STUMP-PULLER.

1,231,618.  Specification of Letters Patent.  Patented July 3, 1917.

Application filed January 3, 1917. Serial No. 140,370.

*To all whom it may concern:*

Be it known that I, NYKOLA KOLOMYJCZUK, a subject of the Emperor of Austria, residing at South Porcupine, in the Province of Ontario and Dominion of Canada, have invented certain new and useful Improvements in Stump-Pullers, of which the following is a specification.

This invention relates to certain new and useful improvements in stump pullers.

The primary object of the invention is the provision of a machine adapted for pulling stumps by motive power, a step by step hoisting means being employed whereby the stumps may be forcibly drawn toward the present device which is suitably anchored against movement.

A further object of the invention is the provision of a vehicle adapted for maintaining in a fixed position and provided with a motor driven mechanism adapted for exerting great pulling power in a step by step operation for forcing objects, such as stumps toward the machine when the mechanism is attached thereto.

The arrangement provides a vehicle having a body through which a draw bar is slidably arranged being anti-frictionally mounted therethrough, motor means being arranged to force the bar rearwardly in a step by step movement while releasable pawls are arranged for ratchetingly engaging the bar for retaining the same in its adjusted position, a disengagement of the operating means with the bar being also provided.

In the drawings forming a part of this application and in which like designating characters refer to corresponding parts throughout the several views:—

Figure 1 is a side elevation of the device.

Fig. 2 is a top plan view thereof.

Fig. 3 is an enlarged vertical longitudinal sectional view taken upon line III—III of Fig. 2.

Fig. 4 is a horizontal longitudinal sectional view taken upon line IV—IV of Fig. 1.

Fig. 5 is a vertical transverse sectional view taken upon line V—V of Fig. 4.

Fig. 6 is a perspective view of the operating slide employed.

Fig. 7 is a perspective view of the forward end portion of the draw bar.

Fig. 8 is a perspective view of the slide releasing means.

Fig. 9 is a side elevation of a modified form of construction with parts removed, and, Fig. 10 is a top plan view thereof.

The present form of stump puller comprises the vehicle 10 having suitable wheels such as two rear wheels 11 and a single forward steering wheel 12, the body 13 of the vehicle being of block formation having a central longitudinal chamber 14 extending therethrough opening at both ends of the vehicle and arranged with a cover plate or platform 15.

The vehicle 10 is drawn to a point convenient of access to the stumps or other members to be pulled and is anchored stationary by any suitable means, such as a rope 16, secured to loops 17 swingingly attached within sockets 18 formed in the rear end of the vehicle body 13. A draw bar 19 is longitudinally slidably arranged within the chamber 14 mounted upon transversely positioned rollers 20 journaled within sockets 21 formed in the bottom of the chamber 14, trunnion rods 22 being provided for the said rollers.

The draw bar 19 is provided with rearwardly inclined teeth 23 upon its upper face adapted for engagement by a rearwardly propelling means hereinafter described. Similar teeth 24 are provided upon both of the opposite sides of the draw bar adapted to be ratchetingly engaged by dogs or pawls 25 pivoted as at 26 within sockets 27 in the side walls of the chamber 14, springs 28 being arranged for normally maintaining the pawls 25 in engagement with the teeth 24. Bell-cranks 29 are pivoted to the opposite sides of the body 13 having their rear ends connected by links 30 with the dogs 25 while their outer ends are pivotally attached to releasing bars 31 connected at their forward ends to depending arms 32 of a cross bar 33, the said bar having an operating lever 34 maintained in its adjusted positions by means of a locking bolt 35 and a toothed segment 36 mounted upon the platform 15. By this arrangement it will be understood that by swinging the lever 34 rearwardly, the bell-cranks 29 are shifted for swinging the pawls 25 outwardly away from the draw bar 19 permitting the free longitudinal movement of the draw bar in a forward direction.

A frame 37 is mounted upon the platform 15 having a driven shaft 38 journaled therethrough and operatively connected to the driving shaft 39 of a suitable motor 40 by means of beveled pinions 41 and 42. The platform 15 has an interrupted portion 43 with which a slot 44 in the rear portion 46 of the platform communicates. An operating slide 47 is shiftably arranged between the opposite sides of the frame 17 working within the interrupted platform portion 43 and having a bottom rack 48 projecting through the slot 44 in normal engagement with the upper teeth 23 of the draw bar 19. A double cam 49 is centrally mounted upon a shaft 50 journaled in the bracket 37, the said shaft 50 being geared to an intermediate shaft 51 which in turn is geared to the driven shaft 38 whereby the motor 40 is adapted to operate the cam 49 in the direction indicated by the arrow in Fig. 3. A roller 52 is transversely journaled in the slide 47 normally maintained within the path of movement of the cam 49 by means of a spring 53 secured as at 54 to the frame 37 and engaging a cross-bar 55 of the said slide.

By this arrangement it will be evident that the operation of the motor 40 revolves the cam 49 producing rearward impulses to the slide 47, thereby forcing the draw bar 19 rearwardly in a step by step movement while the dogs 25 retain the draw bar at its forward adjustment at each impulse and the spring 53 returns the slide 47 forwardly, allowing the rack 48 of the slide to ratchet over the top teeth 23 of the draw bar.

A loop form of spring 56 is carried by a cross bar 57 arranged between opposite posts 58 upon the platform portion 46, the said spring being normally compressed against the slide 47 within a rear depression 59 arranged therein and whereby the slide is operatively maintained in resilient engagement with the draw bar 19. A crank 60 is journaled between the posts 58 provided with links 61 connecting the said crank with rings 62 carried by the rear end of the slide 47 while a link 63 connects with the outer end 64 of the crank 60 for operation by means of a bail form of swinging lever 65 overlying the posts 58. By depressing the lever 65 beneath a hook form of keeper 66, the rear end of the slide 47 will be elevated against the action of the spring 56 thereby disconnecting the operative engagement between the slide and draw bar.

The forward end of the draw bar 19 is arranged with a suitable attaching device, such as the clevis 67 provided with a rope 68 to be secured to the tree trunk or object to be pulled and with the vehicle 10 anchored by means of the rope 16, it will be seen that the operation of the motor 40 in forwardly moving the draw bar 19 in the manner heretofore described operates in forcibly drawing the article attached to the rope 68 in a direction toward the said vehicle 10.

In the form of the device shown in Figs. 9 and 10 of the drawings, the construction is identical to that heretofore described excepting that the vehicle body 13 is rotarily mounted upon a circular base 69 after the manner of a turn table, wheels 70 being provided therefor and hooks 71 being arranged to detachably connect the body 13' and base 69 for preventing the body from revolving. In this form of the device the vehicle may be located among a group of stumps which may be pulled successively by shifting the body 13' rotarily upon its base and without moving the entire vehicle in the manner required by the form of construction shown in Fig. 1.

A serviceable stump puller is thus arranged, the pulling mechanism of which possesses great strength, the arrangement permitting a large number of stumps to be rapidly uprooted.

What I claim as new is:—

1. A stump puller comprising a vehicle, a draw bar longitudinally slidable therethrough, an operating slide upon the vehicle in normal engagement with the said bar, and a motor operated double cam element for reciprocating said slide.

2. A stump puller comprising a vehicle, roller bearings carried thereby, a draw bar longitudinally slidable therethrough, and resting on said rollers and tensioned operating slide upon the vehicle in normal engagement with the said bar, normal forward positioning means for the said slide, a roller carried by the slide, a rearwardly impelling cam member operatively positioned adjacent the slide roller, and motor revolving means for the cam.

3. A stump puller comprising a vehicle, a draw bar longitudinally slidable therethrough, an operating slide upon the vehicle in normal engagement with the said bar, normal forward positioning means for the said slide, a rearwardly impelling cam member operatively positioned adjacent the slide, motor revolving means for the cam, resilient operative positioning means for the slide, and an elevating means for the latter adapted for disengaging the slide from the said bar.

4. A stump puller comprising a body having a longitudinal chamber therethrough, a draw bar slidably arranged within the said chamber and provided with similar teeth upon its opposite sides and upper face, releasable spring-pressed pawls carried by the body in normal engagement with the said side teeth, a reciprocating slide adapted for operative engagement with the top teeth of the bar, a band spring engaging the end of the slide to hold the same in engagement with the draw bar, and a motor operated cam for reciprocating said slide.

5. A stump puller comprising a body having a longitudinal chamber therethrough, a draw bar slidably arranged within the said chamber and provided with similar teeth upon its opposite sides and upper face, releasable spring-pressed pawls carried by the body in normal engagement with the said side teeth, a bracket having opposite side members mounted upon the said body, an operating slide shiftably arranged between the sides of said bracket and having a depending rack in engagement with the upper teeth of said bar when the slide is depressed, and a motor operated double cam for reciprocating the said slide.

6. A stump puller comprising a body having a longitudinal chamber therethrough, a draw bar slidably arranged within the said chamber and provided with similar teeth upon its opposite sides and upper face, releasable spring-pressed pawls carried by the body in normal engagement with the said side teeth, a bracket having opposite side members mounted upon the said body, an operating slide shiftably arranged between the sides of said bracket and having a depending rack in engagement with the upper teeth of said bar when the slide is depressed, a roller transversely journaled upon said slide, a cam operatively carried by the said bracket having a path of movement within the plane of the said roller, revolving means for the said slide, a forwardly impelling return spring for the latter, a depressing spring for said slide arranged substantially overlying the rack thereof, and disengaging means for the said rack adapted for operation simultaneously with the compression of the said spring.

In testimony whereof I affix my signature.

NYKOLA KOLOMYJCZUK.

Copies of this patent may be obtained for five cents each, by addressing the "Commissioner of Patents, Washington, D. C."